(12) United States Patent
Matsuo et al.

(10) Patent No.: US 8,112,036 B2
(45) Date of Patent: Feb. 7, 2012

(54) WIRELESS COMMUNICATION SYSTEM, WIRELESS COMMUNICATION DEVICE, WIRELESS COMMUNICATION METHOD AND PROGRAM

(75) Inventors: Takashi Matsuo, Tokyo (JP); Mitsuhiko Ueda, Kanagawa (JP); Yosuke Tsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 12/442,530

(22) PCT Filed: Apr. 11, 2008

(86) PCT No.: PCT/JP2008/057151
§ 371 (c)(1),
(2), (4) Date: Mar. 24, 2009

(87) PCT Pub. No.: WO2008/133038
PCT Pub. Date: Nov. 6, 2008

(65) Prior Publication Data
US 2009/0253374 A1 Oct. 8, 2009

(30) Foreign Application Priority Data

Apr. 19, 2007 (JP) .................................. 2007-111016

(51) Int. Cl.
*H04B 7/00* (2006.01)
(52) U.S. Cl. ......................... 455/41.2; 455/73
(58) Field of Classification Search ........................ None
See application file for complete search history.

(56) References Cited

U.S. PATENT DOCUMENTS

| 7,489,900 | B2 * | 2/2009 | Kawakami et al. ......... 455/41.2 |
| 7,593,350 | B2 * | 9/2009 | Itoh .............................. 370/254 |
| 7,769,409 | B2 * | 8/2010 | Harris et al. .................. 455/558 |
| RE42,435 | E * | 6/2011 | Katz ........................... 455/456.1 |
| 2005/0015467 | A1 | 1/2005 | Noda |
| 2006/0239236 | A1 | 10/2006 | Otsuka |
| 2007/0002817 | A1 | 1/2007 | Horisawa |
| 2007/0004387 | A1 * | 1/2007 | Gadamsetty et al. ....... 455/414.1 |
| 2007/0037517 | A1 * | 2/2007 | Camuffo et al. ............. 455/41.2 |
| 2007/0184816 | A1 | 8/2007 | Horisawa |

FOREIGN PATENT DOCUMENTS

| JP | 2003 229872 | 8/2003 |
| JP | 2006 303924 | 11/2006 |
| JP | 2007 43644 | 2/2007 |

* cited by examiner

*Primary Examiner* — Cassandra Cox
(74) *Attorney, Agent, or Firm* — Oblon, Spivak, McClelland, Maier & Neustadt, L.L.P.

(57) ABSTRACT

A wireless communication method implemented by a wireless communication device includes performing a non-contact communication with an other wireless communication device. The method also includes receiving predetermined setting data from the other wireless communication device. Further, the method includes establishing a wireless connection with the other wireless communication device by using the predetermined setting data. The method additionally includes storing the predetermined setting data in a storage medium before the wireless connection is released. In addition, the method includes releasing the wireless connection. The method further includes establishing a wireless reconnection with the other wireless communication device by using the predetermined setting data stored in the storage medium. The wireless connection is not necessarily released by the wireless communication device while power is being supplied from outside.

7 Claims, 13 Drawing Sheets

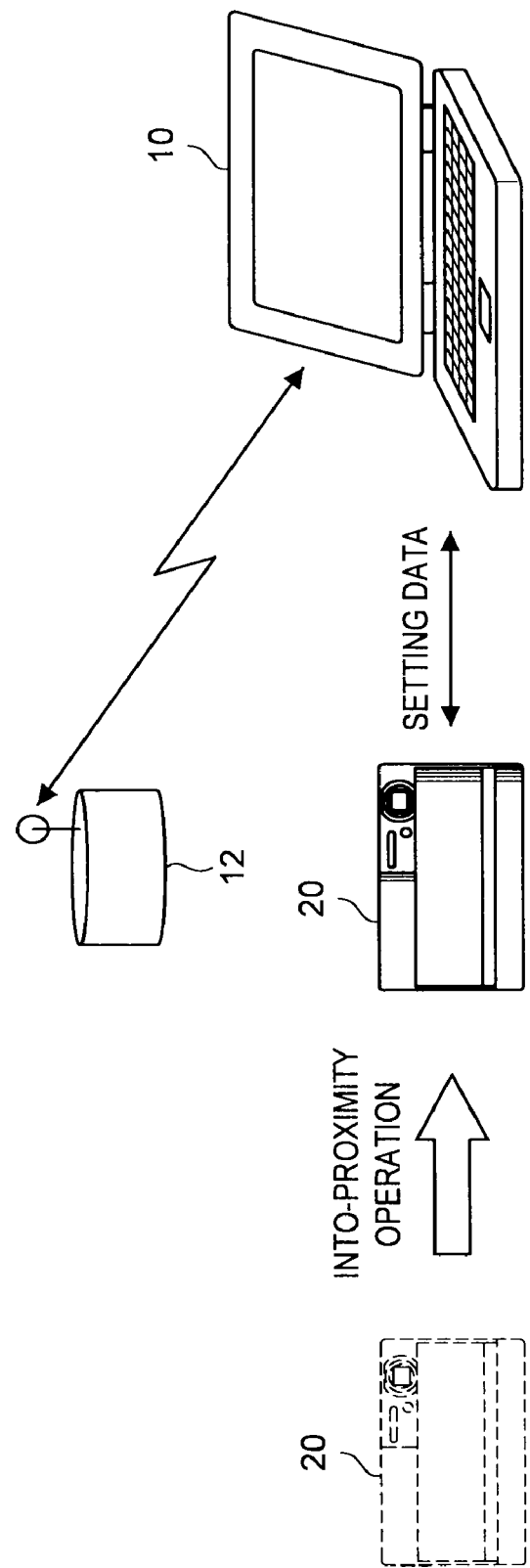

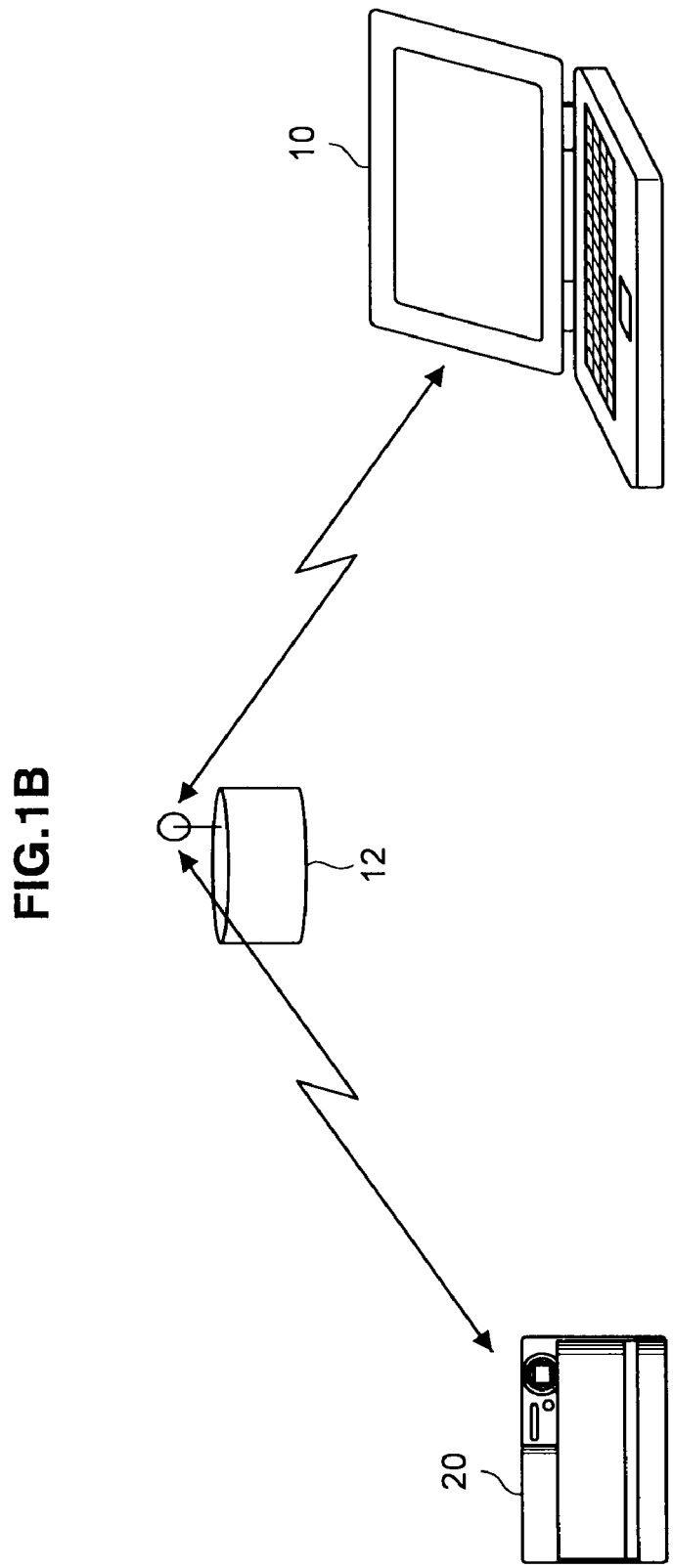

FIG.6

| CONNECTION TECHNOLOGY | Wi-Fi |
| --- | --- |
| CONNECTION TYPE | Infrastructure mode |
| SSID | SSID1 |
| AUTHENTICATION TYPE | WPA |
| ENCRYPTION KEY | ********* |

FIG.10

| COUNTERPART COMMUNICATION DEVICE ID | SETTING DATA | GROUP ID | STORING TIME |
|---|---|---|---|
| | | | |

FIG.11

| GROUP ID | SETTING DATA STORAGE PERIOD |
|---|---|
| DEVICE OF SAME GROUP ID | 1 MONTH |
| DEVICE OF DIFFERENT GROUP ID | 1 HOUR |

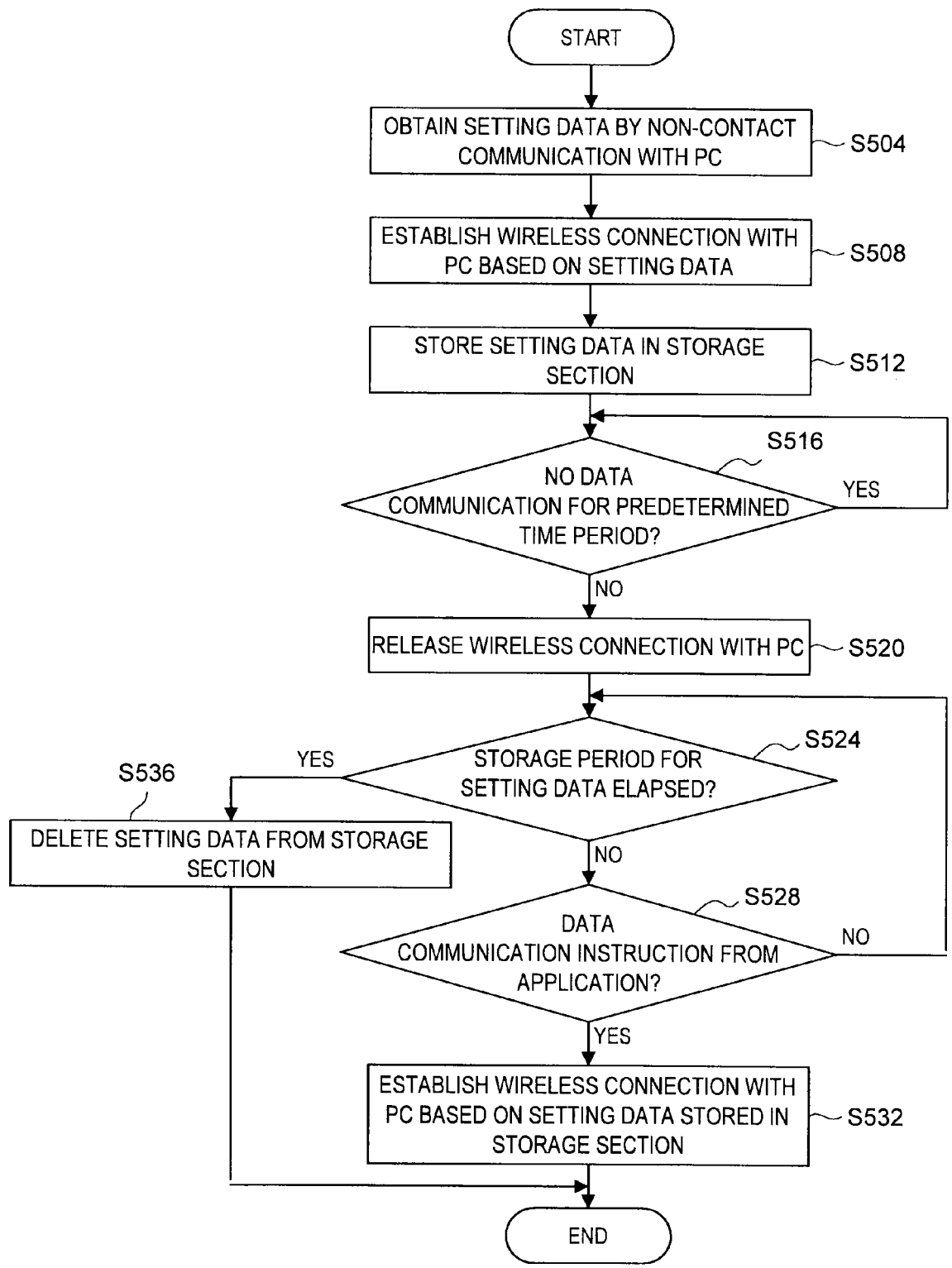

WIRELESS COMMUNICATION SYSTEM, WIRELESS COMMUNICATION DEVICE, WIRELESS COMMUNICATION METHOD AND PROGRAM

TECHNICAL FIELD

The present invention relates to a wireless communication system, a wireless communication device, a wireless communication method and a program.

BACKGROUND ART

Recently, a non-contact communication method has been proposed that uses a terminal that is equipped with a non-contact integrated circuit (IC) chip and a reader/writer that performs reading and writing of data from and to the non-contact IC chip equipped in the terminal. According to such non-contact communication method, by bringing the terminal that is equipped with the non-contact IC chip and the reader/writer into proximity of each other, data communication between the devices is enabled.

Further, wireless communication technologies such as wireless local area network (LAN), Bluetooth (registered trademark), and the like have also become widespread. According to such wireless communication technologies, information can be transmitted and received among a plurality of wireless communication devices without connecting the plurality of communication devices by wire.

On the other hand, to establish a wireless connection between each of the plurality of wireless communication devices, it is needed to input setting data such as address of a wireless network, address information of the wireless communication device of a communication counterpart, and the like to each of the wireless communication devices. It is cumbersome for a user to manually perform input of setting data as such, and thus, a technology of simplifying a setting data input operation is being proposed.

For example, in Patent Document 1, there is disclosed an information processing method of sharing setting data necessary for a wireless connection between a mobile telephone and a personal computer (PC) by using non-contact communication between the mobile telephone and the personal computer, and establishing the wireless connection between the mobile telephone and the personal computer based on the setting data shared by the non-contact communication.
[Patent Document 1] JP-A-2002-204239

DISCLOSURE OF THE INVENTION

Problems to be Solved by the Invention

However, with the conventional information processing method, when a user wishes for a wireless reconnection between the wireless communication devices after the wireless connection between the wireless communication devices is released due to, for example, timeout, the user needed to perform non-contact communication between the respective wireless communication devices by performing again an into-proximity operation of bringing respective wireless communication devices into proximity of each other, and to share the setting data between the respective wireless communication devices. That is, with the conventional information processing method, a user is forced to perform the into-proximity operation every time the wireless reconnection is to be established between the respective wireless communication devices, and thus, there is a problem that the convenience of the user is poor.

Thus, the present invention has been achieved in view of the above-described problem, and the object of the present invention is to provide a wireless communication system, a wireless communication device, a wireless communication method and a program that are new and improved, and capable of establishing with ease a wireless reconnection between the wireless communication devices.

Means for Solving the Problems

To solve the above-described problem, according to an aspect of the present invention, a wireless communication system including a first wireless communication device and a second wireless communication device is provided. More particularly, the first wireless communication device includes a non-contact communication section that transmits setting data necessary for a wireless connection between the first wireless communication device and the second wireless communication device to the second wireless communication device by a non-contact communication method. Further, the second wireless communication device includes a first communication section that receives the setting data transmitted from the first wireless communication device by the non-contact communication method, a second communication section that is capable of establishing a wireless connection with the first wireless communication device, a control section that establishes the wireless connection between the second communication section and the first wireless communication device by using the setting data received by the first communication section, and a data processing section that stores the setting data in a storage medium before the wireless connection is released, wherein the control section uses the setting data stored in the storage medium at the time of establishing a wireless reconnection between the second communication section and the first wireless communication device.

Further, to solve the above-described problem, according to another aspect of the present invention, there is provided a wireless communication device including a first communication section that performs non-contact communication with another wireless communication device and that receives predetermined setting data from the other wireless communication device, a second communication section that is capable of establishing a wireless connection with the other wireless communication device, a control section that establishes the wireless connection between the second communication section and the other wireless communication device by using the setting data, necessary for the wireless connection, received by the first communication section, and a data processing section that stores the setting data in a storage medium before the wireless connection is released, wherein the control section uses the setting data stored in the storage medium at the time of establishing a wireless reconnection between the second communication section and the other wireless communication device.

With such a configuration, the data processing section stores in the storage medium the setting data necessary for the wireless connection between the wireless communication device and the other wireless communication device, and when the need arises for a reconnection after the wireless connection between the wireless communication device and the other wireless communication device is released, the control section reconnects the wireless connection between the wireless communication device and the other wireless communication device by using the setting data stored in the storage medium. Accordingly, according to the wireless communication device, the wireless communication device and the other wireless communication device can be automatically reconnected without the user of the wireless communication device being forced of operations such as the input operation of setting data and the into-proximity operation of the wireless communication device to the other wireless communication device.

The wireless communication device and the other wireless communication device may have group information enabling the identification of a group to which each belongs, and the data processing section may make storage period for the setting data in the storage medium variable depending on whether the group information of the wireless communication device and the group information of the other wireless communication device correspond to each other or not. Here, the storage period for the setting data in the storage medium corresponds to a period during which the wireless reconnection can be established between the wireless communication device and the other wireless communication device by using the setting data. Accordingly, with such a configuration, the period during which the wireless reconnection can be established between the wireless communication device and the other wireless communication device by using the setting data can be made variable depending on the whether group information of the wireless communication device and the group information of the other wireless communication device correspond to each other or not.

The data processing section may make the storage period for the setting data in the storage medium longer for a case where the group information of the wireless communication device and the group information of the other wireless communication device correspond to each other than for a case where the group information of the wireless communication device and the group information of the other communication device differ from each other. With such a configuration, when the group information of the wireless communication device and the group information of the other wireless communication device correspond to each other than, the period during which the wireless reconnection can be established between the wireless communication device and the other wireless communication device by using the setting data can be made longer than when the group information of the wireless communication device and the group information of the other communication device differ from each other.

Further, the wireless communication device further includes a power input section to which power is input from outside, and a communication releasing section that releases the wireless connection between the second communication section and the other wireless communication device, wherein the communication releasing section does not necessarily have to release the wireless connection while power is being supplied via the power input section. With such a configuration, the communication releasing section releases the wireless connection from the viewpoint of reducing the power consumed during the wireless connection between the second communication section and the other wireless communication device and to effectively use the battery. Accordingly, while power is input from outside via the power input section, there is little need to give thought to effective utilization of battery, and thus, the communication releasing section does not release the wireless connection and the process for the wireless reconnection can be eliminated.

Further, to solve the above-described problem, according to another aspect of the present invention, there is provided a program making a computer function as a wireless communication device including a first communication section that performs non-contact communication with another wireless communication device and that receives predetermined setting data from the other wireless communication device, a second communication section that is capable of establishing a wireless connection with the other wireless communication device, a control section that establishes the wireless connection between the second communication section and the other wireless communication device by using the setting data, necessary for the wireless connection, received by the first communication section, and a data processing section that stores the setting data in a storage medium before the wireless connection is released, wherein the control section uses the setting data stored in the storage medium at the time of establishing a wireless reconnection between the second communication section and the other wireless communication device.

Such a program can, for example, make a computer hardware resource that includes a CPU, a ROM, a RAM or the like execute the functions of the control section, the data processing section and the like as described above. That is, it is possible to make a computer that uses the program to function as the above-described wireless communication device.

Further, to solve the above-described problem, according to another aspect of the present invention, there is provided a wireless communication method including the steps of performing non-contact communication with another wireless communication device and receiving predetermined setting data from the other wireless communication device, establishing a wireless connection with the other wireless communication device by using the setting data, storing the setting data in a storage medium before the wireless connection is released, releasing the wireless connection, and establishing a wireless reconnection with the other wireless communication device by using the setting data stored in the storage medium.

Effect of the Invention

As explained above, according to the wireless communication system, a wireless communication device, a wireless communication method and a program according to the present invention, it is possible to establish with ease a wireless reconnection between wireless communication devices.

BRIEF DESCRIPTION OF THE DRAWINGS

FIG. 1A is an explanatory diagram showing an example of the overall configuration of a wireless communication system according to an embodiment of the present invention.

FIG. 1B is an explanatory diagram showing an example of the overall configuration of a wireless communication system according to an embodiment of the present invention.

FIG. 6 is an explanatory diagram showing a concrete example of setting data.

FIG. 10 is an explanatory diagram showing an example of data to be stored in a storage section.

FIG. 11 is an explanatory diagram showing an example of a storage period for setting data in the storage section.

FIG. 12 is a flow chart showing a flow of a wireless communication method to be executed by a portable device according to the present embodiment.

Figure 2:
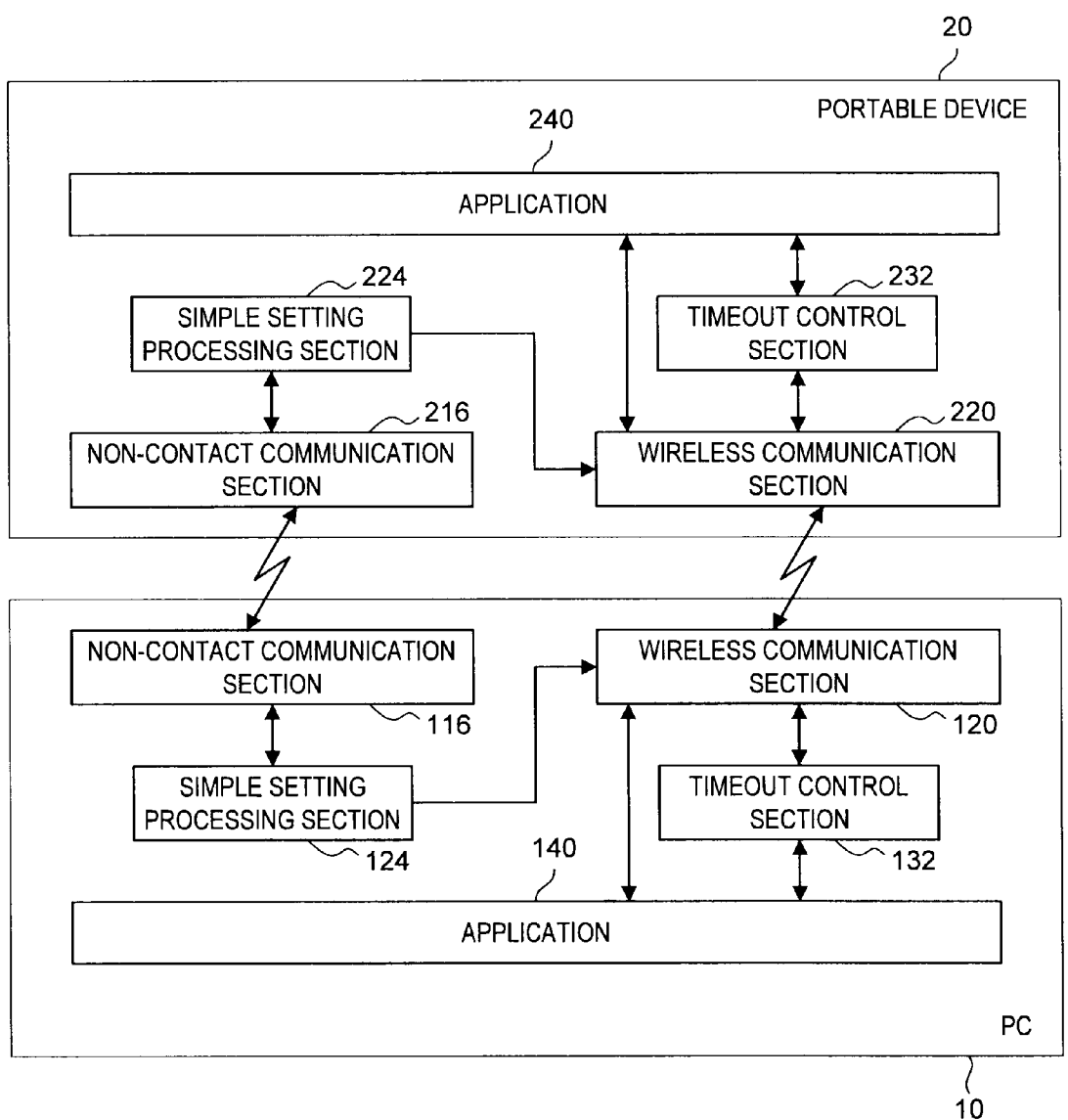
FIG. 2 is a function block diagram showing basic configurations of a personal computer and a portable device according to an embodiment of the present invention.

EXPLANATION OF NUMERALS 12 wireless base station
20 portable device
116, 216 non-contact communication section
120, 220 wireless communication section
124, 224 simple setting processing section
132, 232 timeout control section
140, 240 application
150, 160, 250, 260 storage section

BEST MODE FOR CARRYING OUT THE INVENTION

Hereunder, a preferred embodiment of the present invention will be described in detail with reference to the appended drawings. Incidentally, in the present specification and drawings, as for configuration elements having substantially the same functional configuration, the same numeral is used and the repeated explanation will be omitted.

Further, the best mode for carrying out the invention will be explained in the order shown below.

(1) Overview of a Wireless Communication System According to the Present Embodiment
  (1-1) Basic Configuration of a Wireless Communication Device According to the Present Embodiment
  (1-2) Operation of the Wireless Communication System According to the Present Embodiment
(2) Explanation of a Wireless Communication Device According to a First Embodiment of the Present Invention
  (2-1) Purpose of the Present Embodiment
  (2-2) Hardware Configuration of the Wireless Communication Device According to the Present Embodiment
  (2-3) Functional Configuration of the Wireless Communication Device According to the Present Embodiment
  (2-4) Wireless Communication Method to be Executed by the Wireless Communication Device According to the Present Embodiment
(3) Explanation of a Wireless Communication Device According to a Second Embodiment of the Present Invention
  (3-1) Purpose of the Present Embodiment
  (3-2) Functional Configuration of the Wireless Communication Device According to the Present Embodiment
  (3-3) Wireless Communication Method to be Executed by the Wireless Communication Device According to the Present Embodiment
(4) Conclusion (1) Overview of a Wireless Communication System According to the Present Embodiment First, an overview of a wireless communication system 1 according to the present embodiment will be explained with reference to FIG. 1. According to the wireless communication system 1, a wireless connection can be established with ease among a plurality of wireless communication devices.

FIG. 1 is an explanatory diagram showing an example of the overall configuration of the wireless communication system 1 according to the present embodiment. The wireless communication system 1 includes a personal computer (PC) 10, a wireless base station 12 and a portable device 20.

The personal computer 10 and the portable device 20 are wireless communication devices that implement a non-contact communication function and a wireless communication function. As the wireless communication function, there are a wireless local area network (LAN), Bluetooth (registered trademark), and the like. Further, FIG. 1A shows a situation where the personal computer 10 is connected with the base station 12 of the wireless LAN.

At this time, when the portable device 20 is brought into the proximity of the personal computer 10, the portable device 20 and the personal computer 10 perform a non-contact communication. Then, based on the non-contact communication, the portable device 20 obtains from the personal computer 10 setting data necessary for a wireless connection with the personal computer 10.

Then, as shown in FIG. 1B, based on the setting data obtained from the personal computer 10, the portable device 20 can realize the wireless connection with the personal computer 10 via the base station 12. That is, in the wireless communication system 1, it becomes possible to save the user of the portable device 20 the trouble of manually inputting setting data to the portable device 20.

Note that the personal computer 10 and the portable device 20 are shown in FIG. 1 merely as examples of the wireless communication device, and the wireless communication device may be an information processing device such as a home video processing device (a DVD recorder, a video cassette recorder, or the like), a mobile telephone, a Personal Handyphone System (PHS), a portable music playback device, a portable image processing device, a personal digital assistant (PDA), a home game device, a portable game device, a home appliance, or the like.

Further, in FIG. 1, a case is shown where the wireless connection is established between the personal computer 10 and the portable device 20 via the base station 12. However, the present embodiment is not limited to such an example, and the personal computer 10 and the portable device 20 can be directly connected in an ad hoc manner, for example.

Further, in the above, a case has been explained where the portable device 20 is brought into the proximity of the personal computer 10, and the portable device 20 obtains the setting data. However, by bringing the portable device 20 into the proximity of the personal computer 10, the personal computer 10 may also obtain the setting data and use the same for the wireless connection with the portable device 20.

(1-1) Basic Configuration of a Wireless Communication Device According to the Present Embodiment Next, the basic configurations of the personal computer 10 and the portable device 20 as examples of the wireless communication device according to the present embodiment will be explained with reference to FIG. 2.

FIG. 2 is a function block diagram showing the basic configurations of the personal computer 10 and the portable device 20 according to the present embodiment. The personal computer 10 includes a non-contact communication section 116, a wireless communication section 120, a simple setting processing section 124, a timeout control section 132 and an application 140. Further, the portable device 20 includes a non-contact communication section 216, a wireless communication section 220, a simple setting processing section 224, a timeout control section 232 and an application 240.

The non-contact communication section 116 is a non-contact communication interface with the portable device 20, and may, in some cases, have a function of a reader/writer that communicates with the portable device 20 the setting data and also unique data indicating the communication function of the personal computer 10 or of the portable device 20. For example, the non-contact communication section 116 can transmit radio waves that reach a short distance of approximately 10 cm, drive the non-contact communication section 216 of the portable device 20 that is within the radio transmission footprint, and communicate with the non-contact communication section 216 of the portable device 20. Such non-contact communication section 116 may actually include an antenna and a control section that controls communication that uses the antenna.

The wireless communication section 120 is an interface for a wireless communication with the portable device 20. That is, the wireless communication section 120 can, after a wireless connection with the wireless communication section 220 of the portable device 20 is established based on the operation of the simple setting processing section 124, transmit and receive arbitrary data to and from the portable device 20. Such wireless communication section 120 may be compatible with a wireless LAN or may be compatible with Bluetooth (registered trademark). Further, the wireless communication section 120 may include an antenna, an IC chip, and software that controls the IC chip to transmit and receive arbitrary data to and from the antenna.

The simple setting processing section 124 performs processing for establishing a wireless connection between the wireless communication section 120 of the personal computer 10 and the wireless communication section 220 of the portable device 20. For example, in a case where the wireless communication section 120 is connected to a base station for the wireless communication, the non-contact communication section 116 is made to transmit setting data including the ID of the base station, a network ID, or the like. Or, a wireless connection between the wireless communication section 120 and the wireless communication section 220 of the portable device 20 is established based on the setting data received via the non-contact communication section 116.

The timeout control section 132 has a function of a communication releasing section that releases the wireless connection between the wireless communication section 120 and the wireless communication section 220 of the portable device 20. Since power is necessary to maintain the wireless connection between the personal computer 10 and the portable device 20, if the wireless connection is maintained between the personal computer 10 and the portable device 20 even when the personal computer 10 and the portable device 20 are not actually performing data communication, it may result in an excessive power consumption. Thus, when data communication is not actually being performed between the personal computer 10 and the portable device 20 for a predetermined time period of, for example, one hour, thirty minutes, or the like, the timeout control section 132 releases the wireless connection between the personal computer 10 and the portable device 20, and can contribute to the reduction of power consumption.

The application 140 is software for achieving a specific purpose. For example, the application 140 may be a data editing application, a data communication application, or a program execution application.

The non-contact communication section 216 is a non-contact communication interface with the personal computer 10, and has a function of a first communication section that communicates with the personal computer 10 the setting data and also unique data indicating the communication function of the personal computer 10 or the portable device 20. For example, the non-contact communication section 216 can be driven by the radio waves transmitted from the non-contact communication section 116 of the personal computer 10, and can communicate with the non-contact communication section 116 of the personal computer 10. Such non-contact communication section 216 may actually include an antenna, an IC chip, and software that controls the IC chip to transmit and receive arbitrary data to and from the antenna.

The wireless communication section 220 is an interface for a wireless communication with the personal computer 10, and has a function of a second communication section. That is, the wireless communication section 220 can, after a wireless connection with the wireless communication section 120 of the personal computer 10 is established based on the operation of the simple setting processing section 224, transmit and receive arbitrary data to and from the personal computer 10. Such wireless communication section 220 may be compatible with a wireless LAN or may be compatible with Bluetooth (registered trademark). Further, the wireless communication section 220 may include an antenna, an IC chip, and software that controls the IC chip to transmit and receive arbitrary data to and from the antenna.

The simple setting processing section 224 performs processing for establishing a wireless connection between the wireless communication section 120 of the personal computer 10 and the wireless communication section 220 of the portable device 20. For example, in a case where the wireless communication section 120 of the personal computer 10 is connected to a base station for the wireless communication, setting data including the ID of the base station, a network ID or the like is received via the non-contact communication section 216, and a wireless connection between the wireless communication section 120 of the personal computer 10 and the wireless communication section 220 of the portable device 20 is established based on the setting data.

The timeout control section 232 has a function of a communication releasing section that releases the wireless connection between the wireless communication section 120 of the personal computer 10 and the wireless communication section 220 of the portable device 20. As described above, since power is necessary to maintain the wireless connection between the personal computer 10 and the portable device 20, if the wireless connection is maintained between the personal computer 10 and the portable device 20 even when the personal computer 10 and the portable device 20 are not actually performing data communication, it may result in an excessive power consumption. Thus, the timeout control section 232 may, for example count the time that elapsed after the actual data communication is performed between the personal computer 10 and the portable device 20, and, when the count reaches a predetermined value, may release the wireless connection between the personal computer 10 and the portable device 20. As a result, the timeout control section 232 can contribute to the reduction of power consumption.

The application 240 is software for achieving a specific purpose. For example, the application 240 may be a data editing application, a data communication application, or a program execution application. Data communication between the application 240 and the application 140 of the personal computer 10 is performed via, for example, the wireless communication section 120 and the wireless communication section 220.

(1-2) Operation of the Wireless Communication System According to the Present Embodiment Next, a flow until a wireless connection is established in the wireless communication system 1 according to the present embodiment between the personal computer 10 and the portable device 20 will be explained with reference to FIG. 3.

Figure 3:
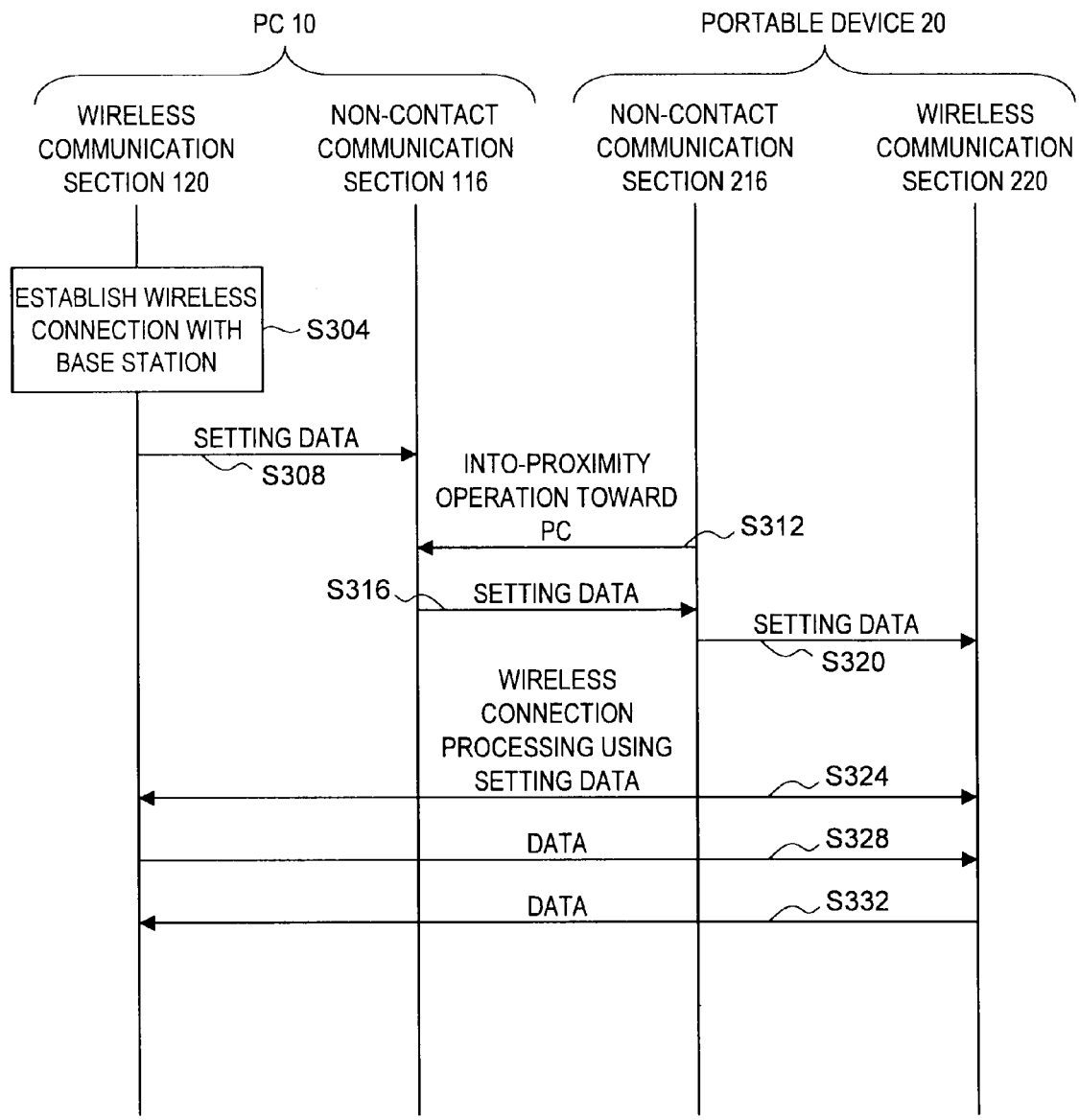
FIG. 3 is a sequence diagram showing a flow of a wireless communication method to be executed by a wireless communication system according to an embodiment of the present invention.

FIG. 3 is a sequence diagram showing a flow of a wireless communication method to be executed by the wireless communication system 1 according to the present embodiment. First, when the wireless communication section 120 of the personal computer 10 establishes a wireless connection with the base station 12 (S304), setting data is output to the non-contact communication section 116 via the simple setting processing section 124 (S308). Next, when the portable device 20 is brought into the proximity of the personal computer 10 (S312), the non-contact communication section 116 of the personal computer 10 transmits the setting data to the non-contact communication section 216 of the portable device 20 (S316).

Next, the simple setting processing section 224 outputs the setting data received by the non-contact communication section 216 of the portable device 20 to the wireless communication section 220 (S320), and performs a wireless connection processing, using the setting data, between the wireless communication section 220 of the portable device 20 and the wireless communication section 120 of the personal computer 10 (S324). Note that the wireless connection processing includes, for example, mutual authentication processing between the portable device 20 and the personal computer 10.

Next, when the wireless connection is established between the personal computer 10 and the portable device 20, arbitrary data is transmitted and received between the wireless communication section 120 of the personal computer 10 and the wireless communication section 220 of the portable device 20 (S328, S332).

As such, the wireless communication system 1 is effective in that the wireless connection between the personal computer 10 and the portable device 20 can be realized without the user of the personal computer 10 or the portable device 20 being forced to perform an input operation of setting data.

(2) Explanation of a Wireless Communication Device According to the Present Embodiment Next, the purposes, particular configurations and the like of the personal computer 10 and the portable device 20 as examples of the wireless communication device according to the present embodiment will be explained in detail.

(2-1) Purpose of the Present Embodiment

As described above, the user of the portable device 20 can establish a wireless connection between the portable device 20 and a counterpart communication device by bringing the portable device 20 and the counterpart communication device into proximity of each other. That is, the user of the portable device 20 can realize the wireless connection between the portable device 20 and the counterpart communication device without performing an input operation of setting data.

However, the wireless connection between the portable device 20 and the counterpart communication device may be released due to various reasons. For example, the timeout control section 232 releases the wireless connection when the portable device 20 and the counterpart communication device do not perform actual communication for a predetermined time. Or, the user of the portable device 20 may release the wireless connection intentionally. When the need arises to establish a wireless reconnection after the wireless connection is released in such a manner, the user of the portable device 20 needs to bring again the portable device 20 into the proximity of the counterpart communication device (into-proximity operation). When such into-proximity operation is forced on the user for every wireless reconnection, there is a problem that it becomes cumbersome for the user.

Accordingly, the portable device 20 according to a first embodiment of the present invention has come to be created by focusing on the circumstance as described above. According to the portable device 20 according to the present embodiment, a wireless reconnection between the portable device 20 and the counterpart communication device can be established with ease. Hereunder, the configuration and operation of such portable device 20 will be explained in detail.

Figure 4:
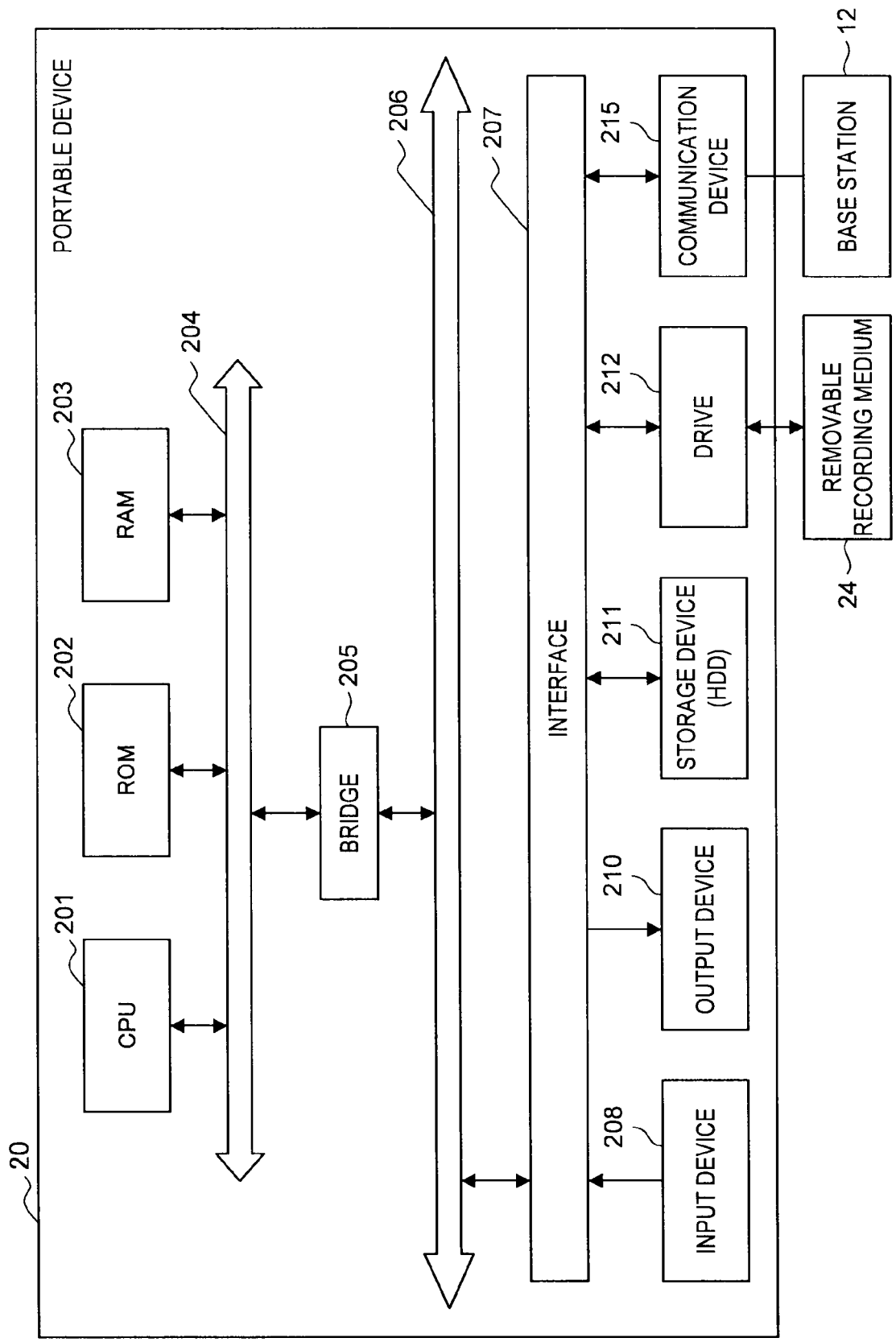
FIG. 4 is a block diagram showing a hardware configuration of a portable device according to a first embodiment of the present invention.

(2-2) Hardware Configuration of the Wireless Communication Device According to the Present Embodiment FIG. 4 is a block diagram showing a hardware configuration of the portable device 20 according to the present embodiment. The portable device 20 includes a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212 and a communication device 215.

The CPU 201 functions as a computation processing device and a control device, and controls the overall operation of the portable device 20 according to various programs. Further, the CPU 201 may be a microprocessor. The ROM 202 stores programs, computation parameters and the like to be used by the CPU 201. The RAM 203 temporarily stores programs to be used by the CPU 201 in its execution, parameters that change as appropriate in the execution of the programs, and the like. These are interconnected by the host bus 204 configured by a CPU bus or the like.

The host bus 204 is connected to the external bus 206, such as a peripheral component interconnect/interface (PCI) bus or the like, via the bridge 205. Note that it is not absolutely necessary to configure the host bus 204, the bridge 205 and the external bus 206 separately, and their functions may be implemented in a single bus.

The input device 208 is configured by input means for the user to input information, such as a mouse, a keyboard, a touch panel, a button, a microphone, a switch, a lever, or the like, for example, an input control circuit that creates an input signal based on the input by the user and outputs the signal to the CPU 201, and the like. The user of the portable device 20 can input various data to the portable device 20 and instruct processing operations to the portable device 20 by operating the input device 208.

The output device 210 is configured by a display device such as a cathode ray tube (CRT) display device, a liquid crystal display (LCD) device, a lamp, or the like, and an audio output device such as a speaker, a headphone, or the like. The output device 210 outputs played-back content, for example. Specifically, the display device displays as text and images various information such as played-back video data and the like. On the other hand, the audio output device converts the played-back audio data and the like into sound and outputs the same.

The storage device 211 is a device for storing data that is configured as an example of the storage section of the portable device 20 according to the present embodiment, and can include a storage medium, a recording device storing data in the storage medium, a readout device reading out data from the storage medium, a deletion device deleting data stored in the storage medium, and the like. The storage device 211 is configured by a hard disk drive (HDD), for example. The storage device 211 drives a hard disk and stores programs to be executed by the CPU 201 and various data. Further, the setting data, the unique data and the like are stored in the storage device 211.

The drive 212 is a reader/writer for a storage medium, and is built into the portable device 20 or is mounted externally on the portable device 20. The drive 212 reads out information stored in an attached removable storage medium 24 such as a magnetic disk, an optical disk, a magneto optical disk, a semiconductor memory, or the like, and outputs the same to the RAM 203.

The communication device 215 is a communication interface that is configured by a communication device or the like for connecting to a communication network 12, for example. Further, the communication device 215 may be a wireless local area network (LAN) compatible communication device, a wireless USB compatible communication device, a wired communication device that performs communication by wire, a non-contact communication compatible device, or a combination of a plurality of the above-described communication devices. The communication device 215 transmits and receives arbitrary data to and from the base station 12 or other wireless communication devices. Note that the hardware configuration of the personal computer 10 can be configured to be substantially the same as for the portable device 20, and the explanation will be omitted.

Figure 5:
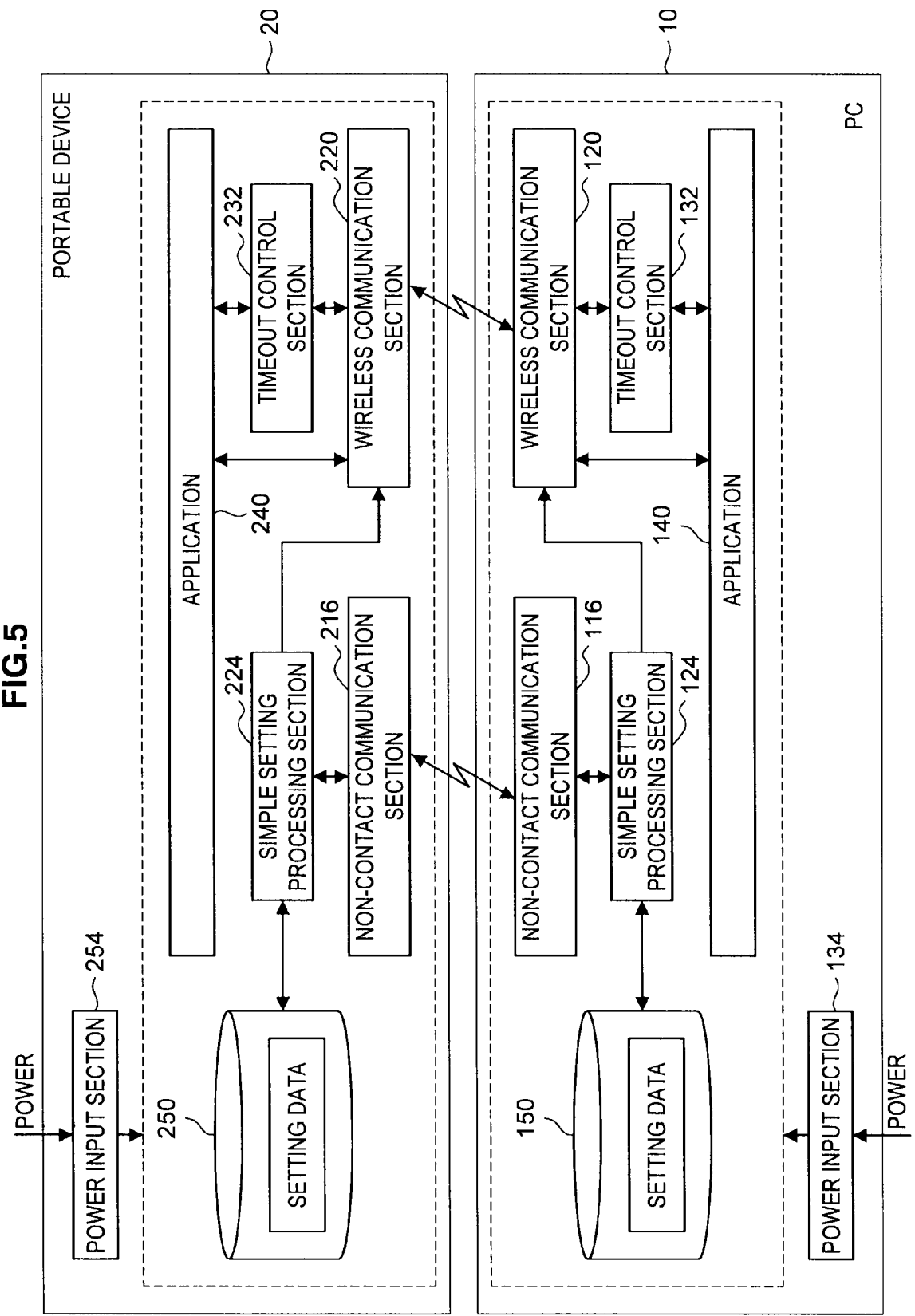
FIG. 5 is a function block diagram showing configurations of a personal computer and the portable device according to the present embodiment.

(2-3) Functional Configuration of the Wireless Communication Device According to the Present Embodiment FIG. 5 is a function block diagram showing configurations of the personal computer 10 and the portable device 20 as examples of the wireless communication device according to the present embodiment. The personal computer 10 includes the non-contact communication section 116, the wireless communication section 120, the simple setting processing section 124, the timeout control section 132, the application 140, the storage section 150 and a power input section 134, and the portable device 20 includes the non-contact communication section 216, the wireless communication section 220, the simple setting processing section 224, the timeout control section 232, the application 240, the storage section 250 and a power input section 254. Many parts of the configurations of the personal computer 10 and the portable device 20 are duplicates of matters explained with reference to FIG. 2, and thus, parts that differ from the matters explained with reference to FIG. 2 will be mainly explained.

The simple setting processing section 224 of the portable device 20 has a function of a control section that establishes a wireless connection between the wireless communication section 220 and the personal computer 10 based on setting data obtained from the personal computer 10 via the non-contact communication section 216, and a function of a data processing section that stores the setting data obtained from the personal computer 10 via the non-contact communication section 216 in the storage section 250.

That is, the simple setting processing section 224 stores the setting data obtained from the personal computer 10 via the non-contact communication section 216 in the storage section 250 before the wireless connection between the wireless communication section 220 and the personal computer 10 is released by the timeout control section 232, for example. Then, when the need arises for the wireless reconnection between the wireless communication section 220 and the personal computer 10, the wireless reconnection between the wireless communication section 220 and the personal computer 10 is established based on the setting data stored in the storage section 250. Note that the need for the wireless reconnection arises when, for example, there is a request from the application 240.

The storage section 250 functions as a storage medium that holds the setting data stored by the simple setting processing section 224. The storage section 250 may be, for example, a non-volatile memory such as an electronically erasable programmable read-only memory (EEPROM), an erasable programmable read-only memory (EPROM) or the like, a magnetic disk such as a hard disk, a circular magnetic disk or the like, an optical disk such as a compact disk recordable (CD-R), a compact disk rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a Blu-ray™ disc rewritable (BD-RE) or the like, a magneto optical (MO) disk, or the like.

The setting data is, as described above, data necessary for the wireless connection between the personal computer 10 and the portable device 20. Hereunder, a concrete example of such setting data will be explained with reference to FIG. 6.

FIG. 6 is an explanatory diagram showing a concrete example of the setting data. As shown in FIG. 6, the setting data includes information necessary for the wireless connection, such as a connection technology for wireless communication, a connection type, a Service Set Identifier (SSID), an authentication type, an encryption key, and the like.

Further, in FIG. 6, setting data is shown where the connection technology is "Wi-Fi" (Wireless Fidelity), the connection type is "Infrastructure mode", the SSID is "SSID 1", the authentication type is "WPA (Wi-Fi Protected Access), and the encryption key is "**********".

Note that, in FIG. 6, a case is shown where the connection technology is "Wi-Fi". However, the connection technology may be "Bluetooth (registered trademark)", and in case the connection technology is "Bluetooth (registered trademark)", information of a Bluetooth (registered trademark) address may be included, instead of the SSID, in the setting data. Further, when the connection type is "ad hoc mode", a network address or the like may be included in the setting data.

Here, returning to the explanation of the configuration of the portable device 20 with reference to FIG. 5, the power input section 254 has a role of receiving input of power from outside and supplying the power to each configuration of the portable device 20. When power is input to the portable device 20 from outside via the power input section 254, it is possible for the timeout control section 232 to not release the wireless connection between the portable device 20 and the personal computer 10. With such a configuration, the timeout control section 232 releases the wireless connection from the viewpoint of reducing the power consumed during the wireless connection between the portable device 20 and the personal computer 10 and to effectively use the battery (not shown). Accordingly, while power is being input from outside via the power input section 254, there is little need to give thought to effective utilization of battery, and thus, the timeout control section 232 does not release the wireless connection and the process for the wireless reconnection can be eliminated.

Heretofore, the configuration of the portable device 20 according to the present embodiment has been explained. Each configuration of the storage section 150 and the power input section 134 of the personal computer 10 can be made to be substantially the same with each configuration of the storage section 250 and the power input section 254 of the portable device 20, and thus, the explanation is omitted.

(2-4) Wireless Communication Method to be Executed by the Wireless Communication Device According to the Present Embodiment Next, a flow of a wireless communication method to be executed by the portable device 20 as an example of the wireless communication device according to the present embodiment will be explained with reference to FIGS. 7 and 8.

Figure 7A:
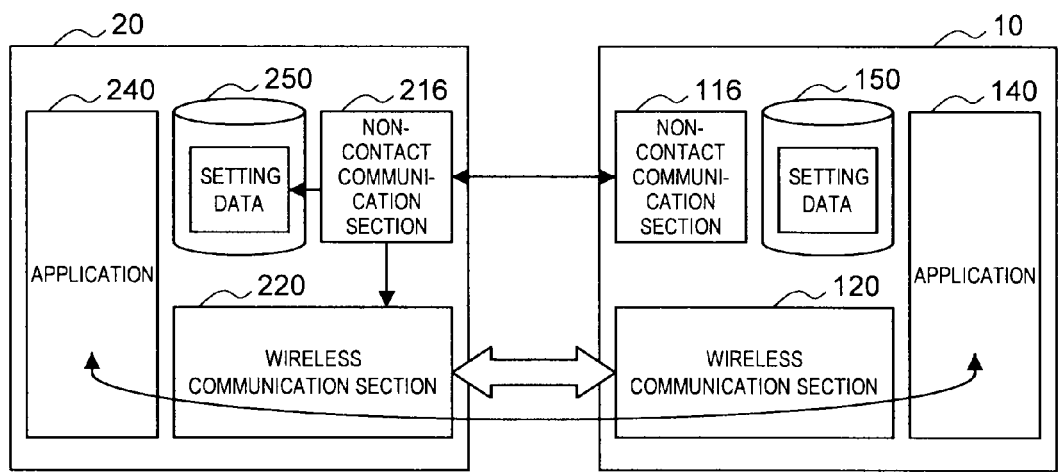
FIG. 7A is an explanatory diagram showing a flow of a wireless communication method to be executed by the portable device according to the present embodiment.
Figure 7B:
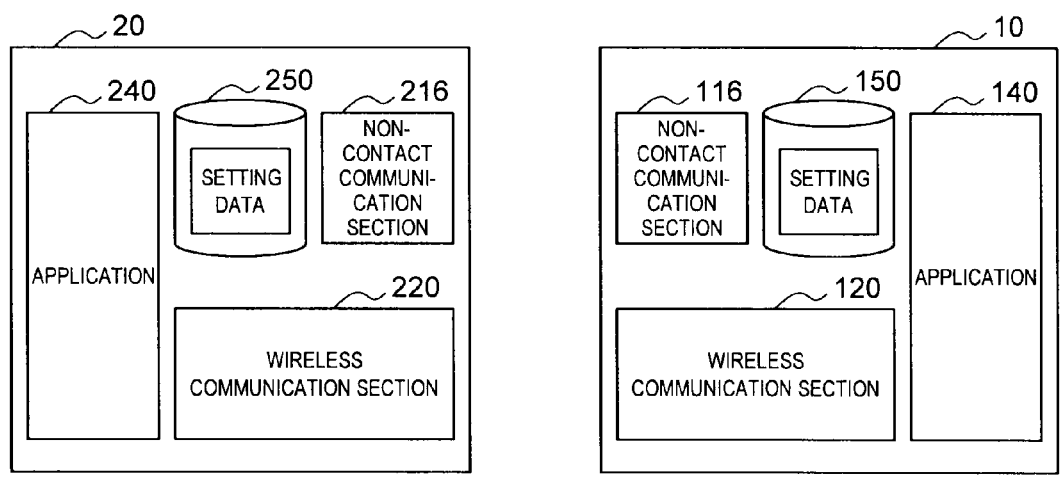
FIG. 7B is an explanatory diagram showing a flow of a wireless communication method to be executed by the portable device according to the present embodiment.
Figure 7C:
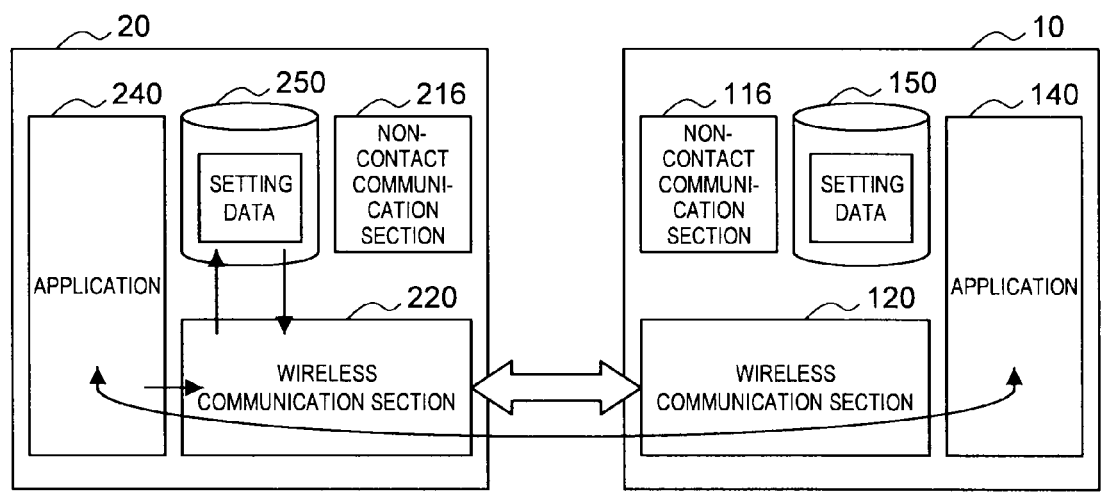
FIG. 7C is an explanatory diagram showing a flow of a wireless communication method to be executed by the portable device according to the present embodiment.

FIG. 7 is an explanatory diagram showing a flow of a wireless communication method to be executed by the portable device 20 according to the present embodiment. First, as shown in FIG. 7A, the non-contact communication section 216 of the portable device 20 obtains setting data from the non-contact communication section 116 of the personal computer 10, a wireless connection is established between the wireless communication section 220 of the portable device 20 and the wireless communication section 120 of the personal computer 10 based on the setting data, and the setting data is stored in the storage section 250. As such, in the state shown in FIG. 7A, since the wireless connection is established between the wireless communication section 220 of the portable device 20 and the wireless communication section 120 of the personal computer 10, arbitrary data can be transmitted and received between the application 240 of the portable device 20 and the application 140 of the personal computer 10.

When, for example, actual communication is not performed for a predetermined time period in a state where the wireless connection is established between the wireless communication section 220 of the portable device 20 and the wireless communication section 120 of the personal computer 10, the wireless connection between the wireless communication section 220 of the portable device 20 and the wireless communication section 120 of the personal computer 10 is released as shown in FIG. 7B. However, the setting data is held in the storage section 250.

Here, it is assumed that a wireless communication via the wireless communication section 220 becomes necessary in a state where the wireless connection between the wireless communication section 220 of the portable device 20 and the wireless communication section 120 of the personal computer 10 is released and the setting data is stored in the storage section 250. In this case, for example, the wireless communication section 220 receives transmission data from the application 240, and performs a wireless connection request to the simple setting processing section 224. Then, the simple setting processing section 224 reads out the setting data from the storage section 250, and establishes a wireless connection between the wireless communication section 220 of the portable device 20 and the wireless communication section 120 of the personal computer 10 based on the setting data that is read out.

Figure 8:
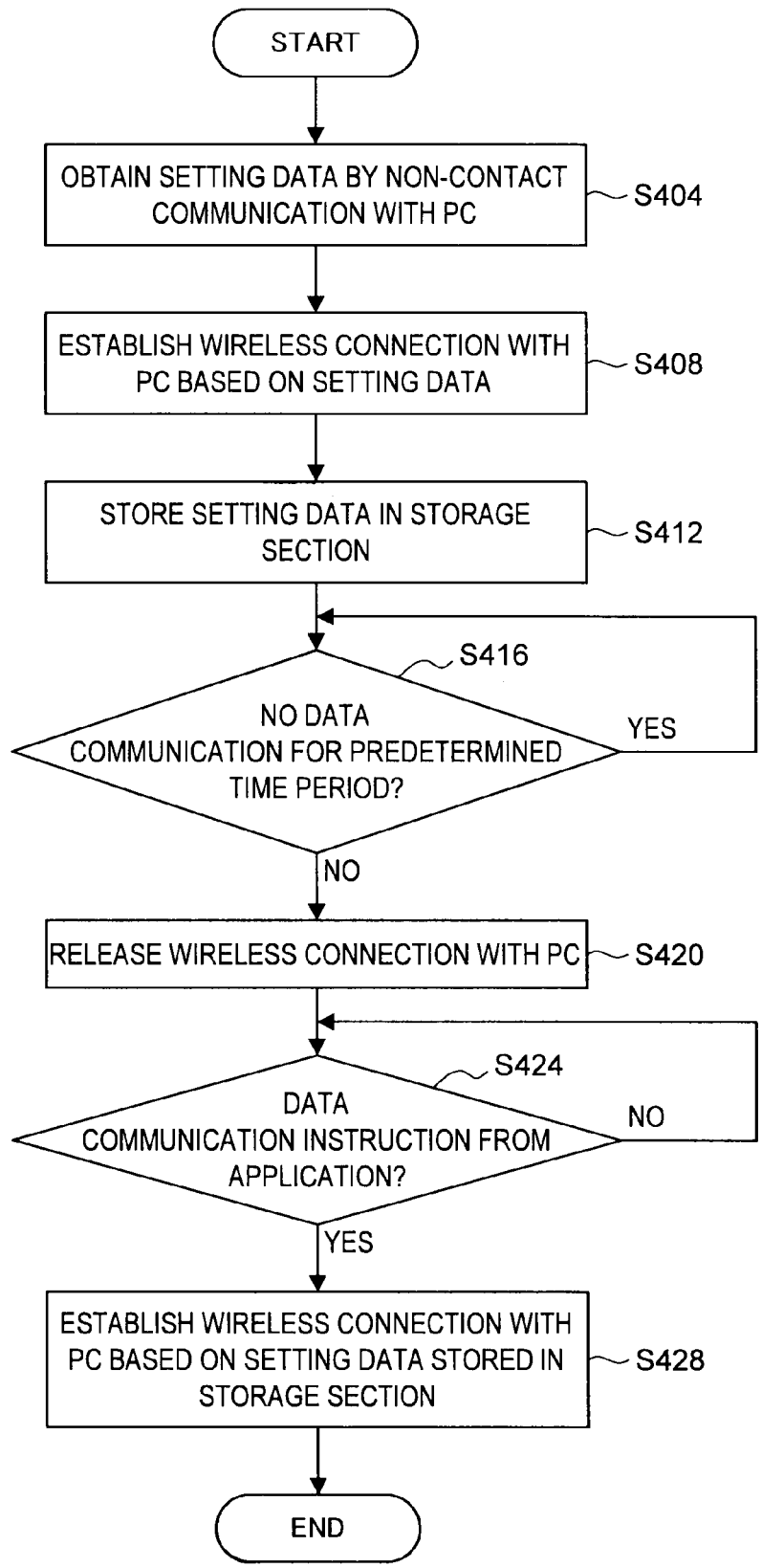
FIG. 8 is a flow chart showing a flow of a wireless communication method to be executed by the portable device according to the present embodiment.

FIG. 8 is a flow chart showing a flow of a wireless communication method to be executed by the portable device 20 according to the present embodiment. First, the portable device 20 obtains setting data by the non-contact communication with the personal computer 10 (S404). Next, the simple setting processing section 224 establishes a wireless connection between the wireless communication section 220 of the portable device 20 and the wireless communication section 120 of the personal computer based on the setting data (S408). Further, the simple setting processing section 224 stores the setting data in the storage section 250 (S412).

Then, the timeout control section 232 judges whether an actual data communication is not performed between the wireless communication section 220 of the portable device 20 and the wireless communication section 120 of the personal computer 10 for a predetermined time period (S416). When an actual data communication is not performed between the wireless communication section 220 of the portable device 20 and the wireless communication section 120 of the personal computer 10 for a predetermined time period, the timeout control section 232 releases the wireless connection between the wireless communication section 220 of the portable device 20 and the wireless communication section 120 of the personal computer 10 (S420).

Next, when the need arises for a wireless reconnection due to, for example, a data transmission request from the application 240 (S424), the simple setting processing section 224 establishes a wireless connection between the wireless communication section 220 of the portable device 20 and the wireless communication section 120 of the personal computer 10 based on the setting data stored in the storage section 250 (S428).

As described above, with the portable device 20 according to the first embodiment of the present invention, the simple setting processing section 224 stores in the storage section 250 setting data necessary for a wireless connection between the portable device 20 and the personal computer 10, and when the need arises for a reconnection after the wireless connection between the portable device 20 and the personal computer 10 is released, reconnects the wireless connection between the portable device 20 and the personal computer 10 by using the setting data stored in the storage section 250. Accordingly, according to the portable device 20, the portable device 20 and the personal computer 10 can be automatically reconnected without the user of the portable device 20 being forced of operations such as an input operation of the setting data and the into-proximity operation of the portable device 20 to the personal computer 10.

(3) Explanation of a Wireless Communication Device According to a Second Embodiment of the Present Invention Next, the purpose, a particular configuration and the like of the portable device 20 as an example of the wireless communication device according to the second embodiment will be explained in detail.

(3-1) Purpose of the Present Embodiment

As described above, with the portable device 20 according to the first embodiment, it is possible to reconnect a wireless connection with ease based on setting data stored in the storage section 250 without forcing the user of the portable device 20 any special operation. On the other hand, with the portable device 20 according to the first embodiment, the period for storing the setting data in the storage section 250 is not particularly specified.

As a result, the portable device 20 according to the first embodiment can automatically establish a wireless reconnection between the portable device 20 and the personal computer 10 regardless of whether the personal computer 10, which is a counterpart communication device of the portable device 20, is a possession of the user of the portable device 20 or not.

However, if the possessor of the portable device 20 and the possessor of the personal computer 10 are different, there is a problem that the possessor of the portable device 20 can execute the wireless reconnection between the portable device 20 and the personal computer 10 without an approval of the possessor of the personal computer 10. That is, there are cases for the portable device 20 according to the first embodiment where the protection of security of each wireless communication device and privacy of the user of each wireless communication device are insufficient.

Accordingly, the portable device 20 according to a second embodiment has come to be created by focusing on the circumstance as described above. According to the portable device 20 according to the second embodiment of the present invention, the protection of security of the counterpart communication device of the portable device 20 and privacy of the counterpart communication device can be enhanced. Hereunder, the portable device 20 according to the present embodiment as such will be explained in detail.

Figure 9:
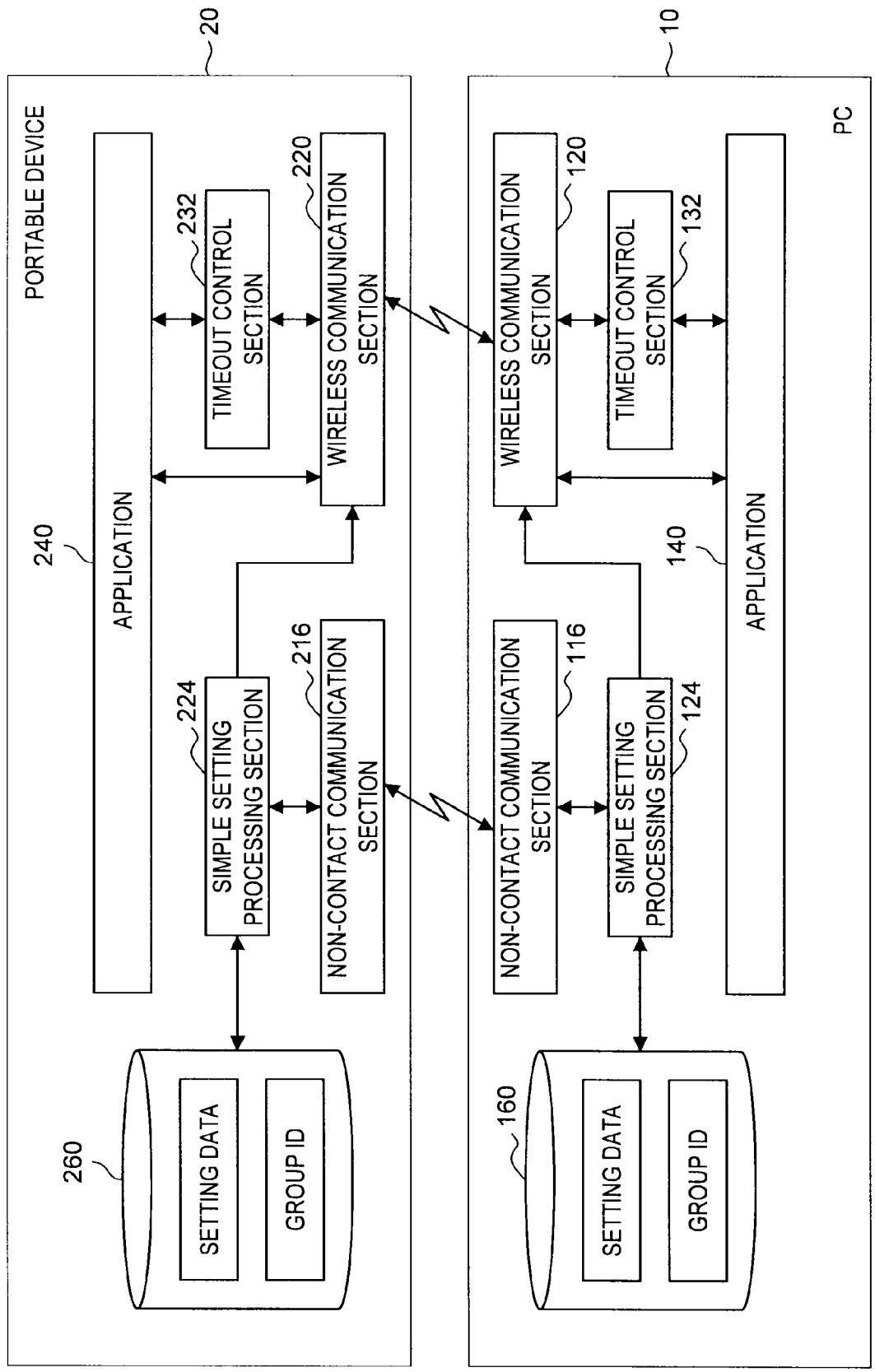
FIG. 9 is a function block diagram showing configurations of a personal computer and a portable device according to a second embodiment of the present invention.

(3-2) Functional Configuration of the Wireless Communication Device According to the Present Embodiment FIG. 9 is a function block diagram showing configurations of the personal computer 10 and the portable device 20 according to the present embodiment. The personal computer 10 includes the non-contact communication section 116, the wireless communication section 120, the simple setting processing section 124, the timeout control section 132, the application 140 and a storage section 160, and the portable device 20 includes the non-contact communication section 216, the wireless communication section 220, the simple setting processing section 224, the timeout control section 232, the application 240 and a storage section 260. Many parts of the configurations of the personal computer 10 and the portable device 20 are duplicates of matters explained with reference to FIG. 2, and thus, parts that differ from the matters explained with reference to FIG. 2 will be mainly explained.

Each of the wireless communication devices, such as the personal computer 10, the portable device 20, and the like according to the present embodiment has a group ID as an example of group information indicating the group to which the self device belongs. As for such group ID, the same group ID is set for the wireless communication devices of the same possessor.

The simple setting processing section 224 obtains the group ID of the personal computer 10, which is the counterpart communication device, from the personal computer 10 via the non-contact communication section 216 or the wireless communication section 220, and stores the same in the storage section 260. Such group ID is stored in the storage section 260 in association with the setting data as shown in FIG. 10, for example.

FIG. 10 is an explanatory diagram showing an example of data to be stored in the storage section 260. As shown in FIG. 10, the simple setting processing section 224 stores in the storage section 260, in association with each other a counterpart communication device ID uniquely assigned to the counterpart communication device, setting data for the counterpart communication device, the group ID of the counterpart communication device, and the storing time of the setting data, for example.

Further, the simple setting processing section 224 makes the storage period for the setting data in the storage section 260 variable as shown in FIG. 11, for example, depending on whether the group ID of the counterpart communication device and the group ID of the portable device 20 correspond to each other or not.

FIG. 11 is an explanatory diagram showing an example of the storage period for the setting data in the storage section 260. As shown in FIG. 11, the simple setting processing section 224 may make the storage period for the setting data for a counterpart communication device whose group ID is the same as the portable device 20 one month, and the storage period for the setting data for a counterpart communication device whose group ID is different from the portable device 20 one hour, for example. That is, the simple setting processing section 224 may delete from the storage section 260 the setting data for the counterpart communication device whose group ID is the same as the portable device 20 when one month has elapsed from the storing time and the setting data for the counterpart communication device whose group ID is different from the portable device 20 when one hour has elapsed from the storing time.

Here, there is a case where the same possessor possesses the devices having the same group ID. Further, the storage period for the setting data in the storage section 260 corresponds to the period during which the wireless reconnection can be established between the portable device 20 and the counterpart communication device by using the setting data. Accordingly, as described above, the period during which the wireless reconnection can be established with the counterpart communication device whose group ID is the same as the portable device 20 by using the setting data can be made longer than the period during which the wireless reconnection can be established with the counterpart communication device whose group ID is different from the portable device 20 by using the setting data. As a result, the wireless reconnection with the counterpart communication device whose group ID is different from the portable device 20 based on the setting data is restricted, and thus, the protection of security of the counterpart communication device, privacy of the user of the counterpart communication device, and the like can be enhanced. Note that the simple setting processing section 224 may also ban the wireless connection with a counterpart communication device with a different group ID.

Further, in the above, a case has been explained where the storing time of setting data is stored in the storage section 260 in association with the setting data and control is performed as to whether the setting data is to be held or not based on the time elapsed since the storing time. However, it is also possible to store the release time of the release of the wireless connection in the storage section 260 in association with the setting data and to perform control as to whether the setting data is to be held or not based on the time elapsed since the release time. Further, the storage section 160 of the personal computer 10 can be configured to be substantially the same as the storage section 260 of the portable device 20, and thus, a detailed explanation is omitted.

(3-3) Wireless Communication Method to be Executed by the Wireless Communication Device According to the Present Embodiment Next, a wireless communication method to be executed by the portable device 20 as an example of the wireless communication device according to the present embodiment will be explained with reference to FIG. 12.

FIG. 12 is a flow chart showing a flow of the wireless communication method to be executed by the portable device 20 according to the present embodiment. First, the portable device 20 obtains setting data by the non-contact communication with the personal computer 10 (S504). Next, the simple setting processing section 224 establishes a wireless connection between the wireless communication section 220 of the portable device 20 and the wireless communication section 120 of the personal computer 10 based on the setting data (S508). Further, the simple setting processing section 224 stores the setting data in the storage section 260 (S512).

Then, the timeout control section 232 judges whether an actual data communication is not performed between the wireless communication section 220 of the portable device 20 and the wireless communication section 120 of the personal computer 10 for a predetermined time period (S516). When an actual data communication is not performed between the wireless communication section 220 of the portable device 20 and the wireless communication section 120 of the personal computer 10 for a predetermined time period, the timeout control section 232 releases the wireless connection between the wireless communication section 220 of the portable device 20 and the wireless communication section 120 of the personal computer 10 (S520).

Next, the simple setting processing section 224 judges whether the storage period for the setting data in the storage section 260 has elapsed or not (S524). When it is judged that the storage period for the setting data in the storage section 260 has not elapsed and, for example, there is an instruction for data communication by wireless communication from the application 240 (S528), the simple setting processing section 224 establishes a wireless connection between the personal computer 10 and the portable device 20 based on the setting data stored in the storage section 260 (S532).

Further, when it is judged that the storage period for the setting data in the storage section 260 has not elapsed and, for example, there is no instruction for data communication by wireless communication from the application 240 (S528), it returns to the process of S524. Further, when it is judged in S524 that the storage period for the setting data in the storage section 260 has elapsed, the simple setting processing section 224 deletes the corresponding setting data stored in the storage section 260 (S536).

(4) Conclusion

As described above, since the portable device 20 according to the first embodiment of the present invention obtains setting data by non-contact communication, the portable device 20 and the personal computer 10 can be automatically reconnected without the user of the portable device 20 being forced of operations such as the input operation of setting data and the into-proximity operation of the portable device 20 to the personal computer 10.

Further, the portable device 20 according to the second embodiment of the present invention makes the storage period for the setting data in the storage section 260 variable depending on the relation between the group ID of the counterpart communication device and the group ID of the self device, and thus, the protection of security of the counterpart communication device, privacy of the user of the counterpart communication device, and the like can be enhanced.

Note that, although the preferred embodiments of the present invention have been explained with reference to the appended drawings, it is needles to say that the present invention is not limited to such examples. It is obvious that various modifications and alterations may be achieved by those skilled in the art within the scope of the claims, and it is understood that they are naturally within the scope of the claims.

For example, in the above described embodiments, a case is explained where the wireless connection between the personal computer 10 and the portable device 20 is established in a state where the personal computer 10 is connected to the base station 12. However, the present invention is not limited to such an example. For example, the wireless connection with the portable device 20 may be established based on setting data that is received by the personal computer 10 from the portable device 20 by bringing the portable device 20 into proximity of the personal computer 10 while the portable device 20 and the base station are connected and having the setting data transmitted from the portable device 20 to the personal computer 10 by a non-contact communication.

Each of the steps to be performed by the portable device 20 in this specification need not necessarily be performed chronologically in the order shown in the flow charts or the sequence diagram, and processing to be executed in parallel or individually (for example, parallel processing or object processing) may also be included.

Further, a computer program can also be created that makes hardware such as the CPU 201, the ROM 202, the RAM 203 and the like built into the personal computer 10 and the portable device 20 function as each of the configurations of the above-described personal computer 10 and the portable device 20. Further, a storage medium in which the computer program is stored is also provided.

What is claimed is:

1. A wireless communication device, comprising:
a first communication section that performs a non-contact communication with an other wireless communication device and that receives predetermined setting data from the other wireless communication device;
a second communication section capable of establishing a wireless connection with the other wireless communication device;
a control section that establishes the wireless connection between the second communication section and the other wireless communication device by using the predetermined setting data, for the wireless connection, received by the first communication section; and
a data processing section that stores the predetermined setting data in a storage medium before the wireless connection is released, wherein the control section uses the predetermined setting data stored in the storage medium at a time of establishing a wireless reconnection between the second communication section and the other wireless communication device, the wireless communication device and the other wireless communication device have group information enabling an identification of a group to which each belongs, and the data processing section makes a storage period for the predetermined setting data in the storage medium variable depending on whether the group information of the wireless communication device and the group information of the other wireless communication device correspond to each other or not.

2. The wireless communication device according to claim 1, wherein the data processing section makes the storage period for the predetermined setting data in the storage medium longer for a case where the group information of the wireless communication device and the group information of the other wireless communication device correspond to each other than for a case where the group information of the wireless communication device and the group information of the other communication device differ from each other.

3. A wireless communication device, comprising:
a first communication section that performs a non-contact communication with an other wireless communication device and that receives predetermined setting data from the other wireless communication device;

a second communication section capable of establishing a wireless connection with the other wireless communication device;

a control section that establishes the wireless connection between the second communication section and the other wireless communication device by using the predetermined setting data, for the wireless connection, received by the first communication section;

a data processing section that stores the predetermined setting data in a storage medium before the wireless connection is released;

a power input section to which power is input from outside; and a communication releasing section that releases the wireless connection between the second communication section and the other wireless communication device, wherein the control section uses the predetermined setting data stored in the storage medium at a time of establishing a wireless reconnection between the second communication section and the other wireless communication device, and the communication releasing section does not release the wireless connection while the power is being supplied via the power input section.

4. A non-transitory, computer-readable storage medium encoded with a program for making a computer function as:

a first communication section that performs a non-contact communication with an other wireless communication device and receives predetermined setting data from the other wireless communication device;

a second communication section capable of establishing a wireless connection with the other wireless communication device;

a control section that establishes the wireless connection between the second communication section and the other wireless communication device by using the predetermined setting data, for the wireless connection, received by the first communication section; and a data processing section that stores the predetermined setting data in a storage medium before the wireless connection is released, wherein the control section uses the predetermined setting data stored in the storage medium at a time of establishing a wireless reconnection between the second communication section and the other wireless communication device, the computer and the other wireless communication device have group information enabling an identification of a group to which each belongs, and the data processing section makes a storage period for the predetermined setting data in the storage medium variable depending on whether the group information of the computer and the group information of the other wireless communication device correspond to each other or not.

5. A non-transitory, computer-readable storage medium encoded with a program for making a computer function as:

a first communication section that performs a non-contact communication with an other wireless communication device and receives predetermined setting data from the other wireless communication device;

a second communication section capable of establishing a wireless connection with the other wireless communication device;

a control section that establishes the wireless connection between the second communication section and the other wireless communication device by using the predetermined setting data, for the wireless connection, received by the first communication section;

a data processing section that stores the predetermined setting data in a storage medium before the wireless connection is released;

a power input section to which power is input from outside; and a communication releasing section that releases the wireless connection between the second communication section and the other wireless communication device, wherein the control section uses the predetermined setting data stored in the storage medium at a time of establishing a wireless reconnection between the second communication section and the other wireless communication device, and the communication releasing section does not release the wireless connection while the power is being supplied via the power input section.

6. A wireless communication method implemented by a wireless communication device, the wireless communication method comprising:

performing a non-contact communication with an other wireless communication device and receiving predetermined setting data from the other wireless communication device;

establishing a wireless connection with the other wireless communication device by using the predetermined setting data;

storing the predetermined setting data in a storage medium before the wireless connection is released;

releasing the wireless connection;

establishing a wireless reconnection with the other wireless communication device by using the predetermined setting data stored in the storage medium; and making a storage period for the predetermined setting data in the storage medium variable, with the wireless communication device, depending on whether group information of the wireless communication device and group information of the other wireless communication device correspond to each other or not.

7. A wireless communication method implemented by a wireless communication device, the wireless communication method comprising:

performing a non-contact communication with an other wireless communication device and receiving predetermined setting data from the other wireless communication device;

establishing a wireless connection with the other wireless communication device by using the predetermined setting data;

storing the predetermined setting data in a storage medium before the wireless connection is released;

releasing the wireless connection; and establishing a wireless reconnection with the other wireless communication device by using the predetermined setting data stored in the storage medium, wherein the wireless connection is not released by the wireless communication device while power is being supplied from outside.

* * * * *